Patented Sept. 28, 1954

2,690,447

UNITED STATES PATENT OFFICE 2,690,447

PROCESS FOR IMPROVING THE STABILITY OF ZINC ETHYLENEBISDITHIOCARBAMATE

Christian B. Luginbuhl, Wilmington, Del., assignor to E. I. du Pont de Nemours and Company, Wilmington, Del., a corporation of Delaware No Drawing. Application October 10, 1952, Serial No. 314,211

4 Claims. (Cl. 260—429)

This invention relates to methods for improving the stability of zinc ethylenebisdithiocarbamate.

Zinc ethylenebisdithiocarbamate has found considerable commercial usage as a fungicidal agent especially in application to agricultural crops. The product and formulations containing it are in commerce sometimes subjected to adverse storage conditions such as elevated temperature and high humidity. The product tends to suffer from loss of active ingredients during such storage. I have now found a straightforward method for treating zinc ethylenebisdithiocarbamate so that its tendency to decompose under adverse storage conditions is largely eliminated.

Zinc ethylenebisdithiocarbamate is prepared by the reaction of a zinc salt such as zinc chloride or zinc sulfate with disodium ethylenebisdithiocarbamate usually in aqueous medium. The zinc ethylenebisdithiocarbamate is extremely insoluble in water and precipitates as it is formed.

Heretofore, it has been the practice to form the zinc ethylenebisdithiocarbamate under alkaline conditions, the zinc salt reactant being added to an aqueous solution of disodium ethylenebisdithiocarbamate, the latter solution normally being about pH 9 to 10 at the outset. This was in accordance with the practice of avoiding the subjection of dithiocarbamates generally to acid conditions because of recognized instability of dithiocarbamic acids and their salts under such conditions. Notwithstanding this, however, I have found that as to zinc ethylenebisdithiocarbamate not only can the compound be safely subjected to certain acid conditions without decomposition but that treatment under acid conditions effects marked improvement in the stability of the compound against decomposition.

According to this invention, the stability of zinc ethylenebisdithiocarbamate is improved by maintaining the compound in particulate form in contact with acidified water at pH 1.5 to 6 for at least 30 minutes.

The processes of the invention are preferably carried out by suspending the zinc ethylenebisdithiocarbamate in the acidified water during the holding period by means of agitation so that there is what might be termed a dispersion or slurry of particles of the zinc ethylenebisdithiocarbamate in the water.

The concentration of zinc ethylenebisdithiocarbamate in the dispersion or slurry is not especially critical. In general, any concentration providing a mass which can be satisfactorily mixed by the usual mixing devices can be used. It will usually be found most convenient to have an aqueous dispersion or slurry containing from about 5 to 15% zinc ethylenebisdithiocarbamate.

In practicing the processes of the invention, the pH of the aqueous dispersion is maintained, as mentioned previously, within the range of about 1.5 to 6. More preferably, the aqueous dispersion is maintained at pH 2 to 5 and still more preferably at about pH 3±0.5. The pH condition of the aqueous dispersion is created and maintained by adding a strong mineral acid such as hydrochloric acid or sulfuric acid to the dispersion as required.

The processes of the invention are conveniently carried out at temperatures of from 25 to 50° C., and more preferably from 30 to 45° C. Temperatures substantially above 50° C. tend to counteract the stabilizing action of the processes.

In order to obtain the full benefits of the stabilizing action of the processes of the invention, the holding period under the above recited conditions should be at least 30 minutes. In general it will be from one-half to three hours and in certain preferred embodiments, from one to two hours. It will be understood that the necessary holding time to obtain optimum results will vary with the pH and the temperature employed, the lower the pH, the shorter the holding time, and the lower the temperature, the longer the holding time.

The stabilizing action of the processes of the invention is effective on crude or technical zinc ethylenebisdithiocarbamate however prepared. Thus, for example, it is highly beneficial for the stabilization of zinc ethylenebisdithiocarbamate prepared by the reaction of a zinc salt of a strong mineral acid with disodium ethylenebisdithiocarbamate in water with agitation as illustrated for instance in Example II of Flenner U. S. Patent 2,545,948. It is also effective, altho not quite to the same striking extent, with zinc ethylenebisdithiocarbamate obtained in the low pH process of my copending application, Serial No. 314,212, filed October 10, 1952, in which the precipitation of zinc ethylenebisdithiocarbamate is carried out in aqueous solution at pH 1.5 to 6.

In order to carry out the processes of the invention, it is not necessary to separate precipitated zinc ethylenebisdithiocarbamate from the reaction mass in which it is formed and then subsequently to disperse the separated product in the acidified water. The invention is suitably carried out by simply acidifying as required the aqueous reaction mass in which the zinc ethylenebisdithiocarbamate has been precipitated and then proceeding with the treatment described heretofore.

In order that the invention may be better understood, the following detailed examples are given in addition to the examples already given above.

*Example 1*

Into a 2 liter creased flask was charged 1260 ml. of water, and the temperature was adjusted to 35° C. While maintaining the temperature at 35° C. by means of a water bath, 270 ml. each of one molar zinc chloride solution and one molar disodium ethylenebisdithiocarbamate solution were added separately with good mixing, at a steady rate, in the course of 53 minutes. During the addition of the zinc chloride and the disodium ethylenebisdithiocarbamate solutions, the pH of the reaction mixture was maintained in the range 2.4–3.4 by the separate addition of 1.035 normal hydrochloric acid. A total of 9.0 ml. of acid was required in addition to the 3.4 ml. of acid present in the 1 molar zinc chloride solution (the latter 3.4 ml. to prevent hydrolysis and precipitation of basic zinc chloride in the 1 molar zinc chloride solution).

Approximately 10 minutes after the precipitation was completed, about half of the slurry was withdrawn, filtered, washed well with water, and dried in a vacuum oven at 40° C. (Product A).

The remaining slurry was held at 35° C. and a pH of 3.0–3.5 for 180 minutes requiring an additional 1.2 ml. of 1.035 normal hydrochloric acid. It was filtered, washed well with water, and dried in a vacuum oven at 40° C. (Product B). Both samples were analyzed by the carbon disulfide evolution method and found to contain over 99% zinc ethylenebisdithiocarbamate.

Decomposition of Product A was equivalent to a loss of 10.2% of the zinc ethylenebisdithiocarbamate in 500 hours when stored at 45° C., 80% relative humidity in air. The loss of zinc ethylenebisdithiocarbamate under the same conditions in Product B was 4.4%.

*Example 2*

Zinc ethylenebisdithiocarbamate was prepared as follows: To a glass reaction vessel equipped with an agitator was charged 0.35 gram mol of disodium ethylenebisdithiocarbamate - hexahydrate dissolved in 752 milliliters of water. This solution was heated to 35° C. and to it with good agitation was added over a period of 47 minutes an aqueous solution containing 0.377 gram mol zinc chloride and 4.4 milliliters of 1.035 N hydrochloric acid in 323 milliliters of water. During the addition of the zinc chloride solution, the pH dropped from 9.9 to about 9.0. Zinc chloride addition was interrupted when the precipitation mixture gave a negative test for ethylenebisdithiocarbamate ion using a ferric chloride spot test. In the spot test the absence of any black precipitate indicates that all of the ethylenebisdithiocarbamate ion has been consumed by the zinc ion. The cream-colored reaction slurry produced above was divided into two parts.

Part A consisted of 565 milliliters of the slurry. This was filtered and washed by reslurrying so as to remove the soluble sodium chloride. The filter cake was then dried in a vacuum oven at 40° C. and the dry product was labeled Product A.

The remainder of the precipitation reaction slurry, part B of the slurry, was retained in the precipitation vessel and to it was added 25 milliliters of 1.035 N hydrochloric acid. The pH immediately began to drop slowly. The precipitation slurry, part B, was then maintained for two and one-half hours at a pH of from 2.7 to 3.2 by the gradual addition of 0.1 N aqueous sodium hydroxide. The slurry, part B, was then filtered and the dissolved sodium chloride removed by repeated reslurrying in water and by filtration. The filter cake was dried in a vacuum oven at 40° C. The dry product was labeled Product B.

Product A and Product B from above were subjected to accelerated storage conditions at 45° C. and 80% relative humidity for 500 hours. At the conclusion of this storage period, Product A had decomposed to the extent of a 40% loss in active ingredient, while Product B had suffered to the extent of only an 11% loss in active ingredient.

*Example 3*

Two liters of a one molar solution of sodium chloride in water were charged into a 5 liter glass reaction flask fitted with pH electrodes, a high speed agitator, two addition burettes, a feed line for nitrogen, and an exit line to a gas absorption train.

While agitating the liquid in the reaction flask, one liter of a solution consisting of 1 mole of C. P. grade zinc chloride and 0.05 mole of C. P. grade hydrogen chloride in water, and 1 liter of a solution consisting of 1 mole of recrystallized disodium ethylenebisdithiocarbamate hexahydrate in water were added gradually in separate streams into the flask.

The flow of the acidified zinc chloride solution was started first. When about 0.02 mole of the 1 mole of zinc chloride solution had been added, the addition of the 1 mole of solution of sodium ethylenebisdithiocarbamate was started and continued simultaneously with that of the zinc chloride solution so that the reactants were being added in substantially stoichiometrically equivalent amounts. The rate of addition of the acidified zinc chloride solution was modified slightly however from time to time as required to maintain the pH of the reacting mass at 3.1±0.3.

Addition of the reactant solutions was completed in 1.4 hours. The temperature of the reacting mass was maintained at 26.5–28.5° C. thruout this period. Nitrogen was fed into the reactor during the reaction to maintain a slight nitrogen pressure. Analysis of the effluent gas showed that it contained substantially no hydrogen sulfide or carbon disulfide.

Upon completion of addition of the reactants, the white zinc ethylenebisdithiocarbamate precipitate which had formed was allowed to remain in the reaction mass for an additional 30 minutes under the same pH, temperature, and agitation conditions maintained during the reaction. The precipitate was then filtered and washed with water until the filtrate contained less than 0.1% salt. The wet cake was dried under vacuum at 25° C. to a water content of 0.85% as determined by toluene distillation and titration with Karl Fisher Reagent.

The dried product analyzed over 99% zinc ethylene-bisdithiocarbamate by the carbon disulfide evolution method. The carbon disulfide evolution method is described in Anal. Chem. 23, 1842 (1951) "Determination of Dithiocarbamates" by D. G. Clarke, H. Baum, E. L. Stanley, and W. F. Hester. Applying this technique, an 0.5 g. sample of the product is digested at 100° C. in the absence of air in a liquid mixture of 50 cc. of 9

N sulfuric acid and 50 cc. of 50% by volume aqueous ethanol. Any hydrogen sulfide formed during the digestion of the sample is absorbed in aqueous cadmium chloride prior to the absorption of carbon disulfide which is liberated. The liberated carbon disulfide is absorbed in methanolic potassium hydroxide and the resulting xanthate is titrated with standard iodine solution. Under the digestion conditions of this technique, the dithiocarbamate group breaks down quantitatively with liberation of carbon disulfide. The amount of hydrogen sulfide formed is taken as an index of impurities since with pure zinc ethylenebisdithiocarbamate no hydrogen sulfide is formed.

The resistance of the product of this example to decomposition was measured by subjecting it to accelerated "aging" conditions. It was held in air at 45° C. and 80% relative humidity. After 506 hours at these severe conditions, the loss of zinc ethylenebisdithiocarbamate was only 6.3%.

I claim:

1. A process for improving the stability of zinc ethylenebisdithiocarbamate comprising maintaining said compound in particulate form in contact with acidified water at pH 1.5 to 6 for at least 30 minutes.

2. A process for improving the stability of zinc ethylenebisdithiocarbamate comprising maintaining said compound in particulate form in contact with acidified water at pH 2 to 5 for at least 30 minutes at 25° C. to 50° C.

3. A process for improving the stability of zinc ethylenebisdithiocarbamate comprising maintaining a dispersion of particles of said compound in acidified water at pH 2 to 5 for one-half to three hours at 30° C. to 45° C.

4. A process for improving the stability of zinc ethylenebisdithiocarbamate comprising precipitating said compound by the reaction of a zinc salt of a strong mineral acid with disodium ethylenebisdithiocarbamate in water with agitation to form a dispersion of particulate zinc ethylenebisdithiocarbamate in an aqueous medium and maintaining said dispersion in aqueous medium at pH 2 to 5 at a temperature of 30° C. to 45° C. for one-half to three hours.

References Cited in the file of this patent

UNITED STATES PATENTS

| Number | Name | Date |
|---|---|---|
| 2,406,960 | Neal | Sept. 3, 1946 |
| 2,504,404 | Flenner | Apr. 18, 1950 |
| 2,545,948 | Flenner | Mar. 21, 1951 |